(12) United States Patent
Jacobson et al.

(10) Patent No.: US 11,898,703 B2
(45) Date of Patent: Feb. 13, 2024

(54) LARGE-SCALE VACUUM INSULATED CRYOGENIC STORAGE

(71) Applicant: CB&I STS Delaware LLC., Houston, TX (US)

(72) Inventors: John Andrew Jacobson, Plainfield, IL (US); Steven Matthew Cihlar, St. Charles, IL (US); Yaming Li, Westmount, IL (US); Koray Kuscu, Naperville, IL (US); Randy Lee Eberly, Plainfield, IL (US)

(73) Assignee: CB&I STS Delaware LLC., Houston, TX (US)

( * ) Notice: Subject to any disclaimer, the term of this patent is extended or adjusted under 35 U.S.C. 154(b) by 0 days.

(21) Appl. No.: 17/737,760

(22) Filed: May 5, 2022

(65) Prior Publication Data

US 2022/0356994 A1    Nov. 10, 2022

Related U.S. Application Data

(60) Provisional application No. 63/184,604, filed on May 5, 2021.

(51) Int. Cl.
*F17C 13/00*    (2006.01)

(52) U.S. Cl.
CPC .......... *F17C 13/001* (2013.01); *F17C 13/002* (2013.01); *F17C 2201/0128* (2013.01); *F17C 2201/052* (2013.01); *F17C 2203/0391* (2013.01); *F17C 2209/221* (2013.01); *F17C 2209/232* (2013.01); *F17C 2223/0161* (2013.01); *F17C 2260/013* (2013.01)

(58) Field of Classification Search
CPC ...... B65D 88/04; B65D 81/38; B65D 11/105; B65D 2501/2405; F17C 13/001; F17C 13/002; F17C 2209/221; F17C 2209/232; F17C 2201/0128; F17C 2201/052; F17C 2203/0391; F17C 2223/0161; F17C 2260/013; F17C 2260/033; F01D 25/243; F16B 2200/50

USPC ..... 220/560.12, 560.04, 592, 581, 679, 678, 220/677, 560.09, 4.25; 403/337, 335

See application file for complete search history.

(56) References Cited

U.S. PATENT DOCUMENTS

| | | | | |
|---|---|---|---|---|
| 1,161,419 A | * | 11/1915 | Slick .................. | B23K 1/18 219/137 R |
| 1,599,927 A | * | 9/1926 | Stresau .............. | B23K 33/004 219/137 R |

(Continued)

FOREIGN PATENT DOCUMENTS

WO    2007142400 A1    12/2007

OTHER PUBLICATIONS

International Search Report / Written Opinion issued to PCT/US2022/027889 dated Sep. 2, 2022.

*Primary Examiner* — Robert J Hicks
(74) *Attorney, Agent, or Firm* — Patterson + Sheridan, LLP

(57) ABSTRACT

Implementations of the present disclosure generally relate to an apparatus for large-scale external pressure storage, and more particularly for large-scale storage of liquid hydrogen and other products that require evacuated insulation. In some examples, a plate for a storage apparatus is provided. The plate a body that includes a beveled joint with the body having a nominal thickness at the beveled joint. The beveled joint is configured to be welded to a corresponding beveled joint of an adjacent plate.

18 Claims, 5 Drawing Sheets

(56) References Cited

U.S. PATENT DOCUMENTS

| | | |
|---|---|---|
| 2,386,958 A | 10/1945 | Jackson |
| 3,945,236 A | 3/1976 | Tooper |
| 4,181,235 A | 1/1980 | Baysinger |
| 5,307,979 A | 5/1994 | Kim |
| 5,662,264 A | 9/1997 | Gustafsson et al. |
| 2014/0097189 A1 | 4/2014 | Simmons et al. |

* cited by examiner

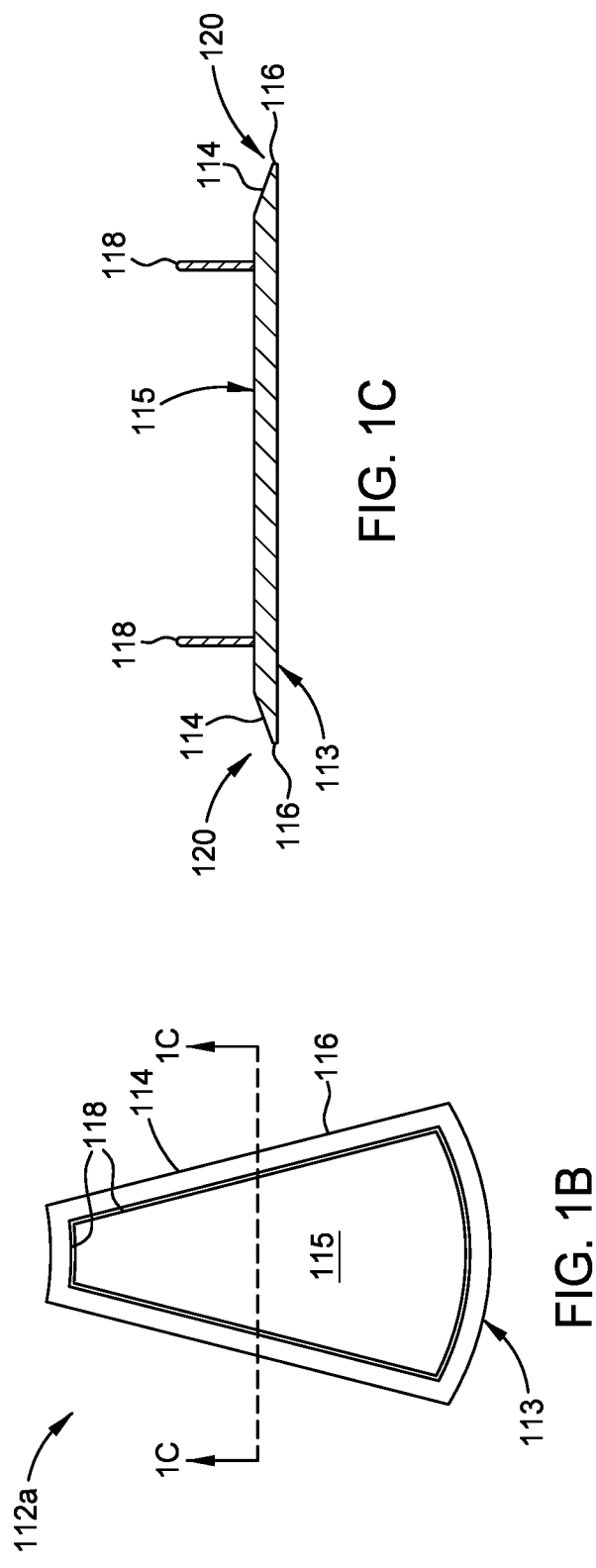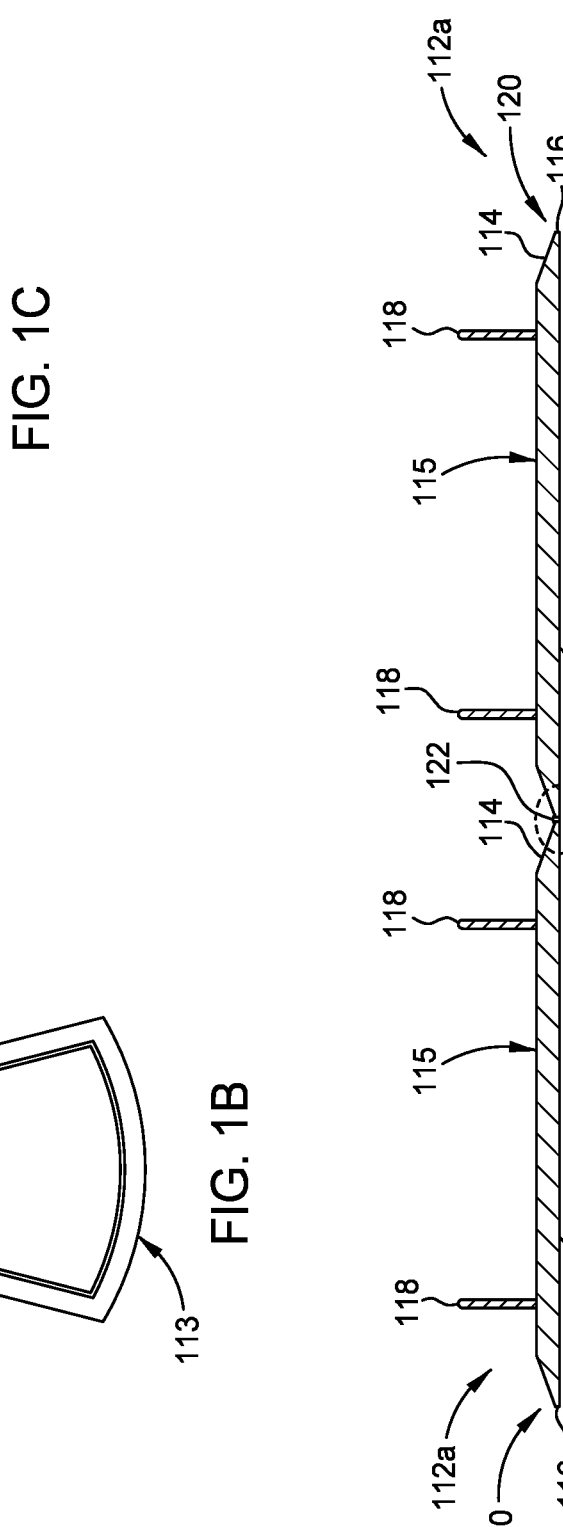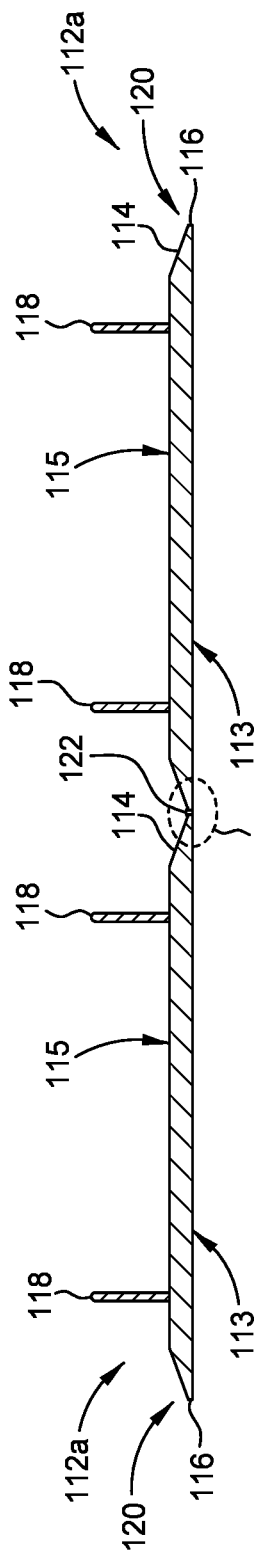

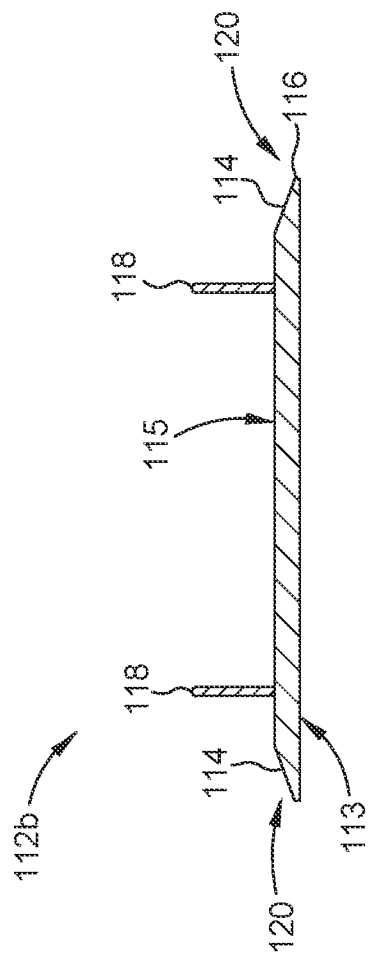
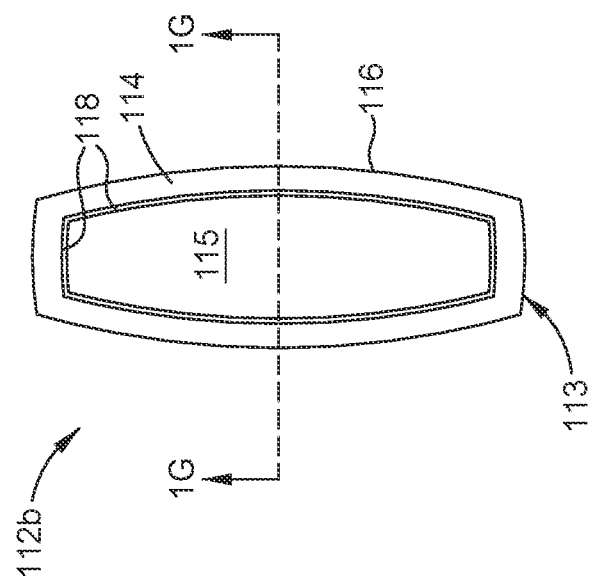

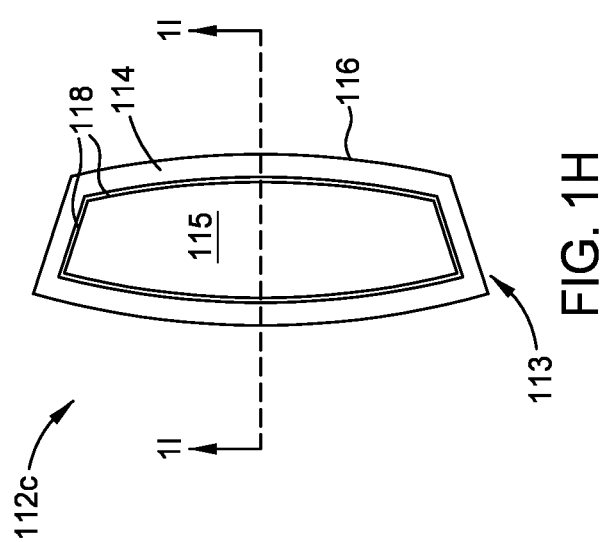
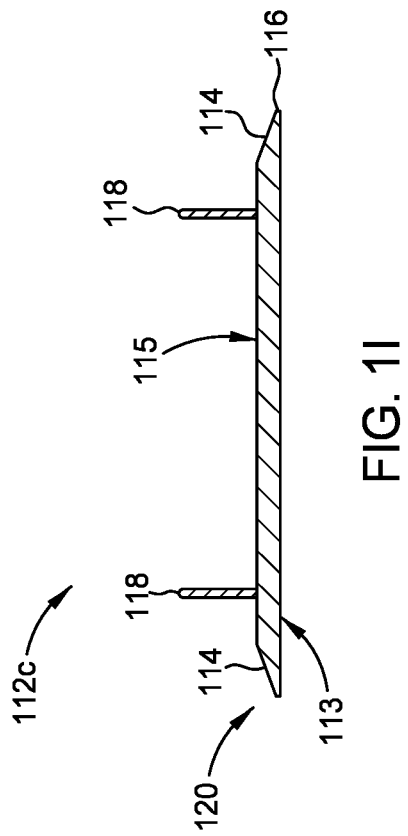

LARGE-SCALE VACUUM INSULATED CRYOGENIC STORAGE

CROSS-REFERENCE TO RELATED APPLICATIONS

This application claims the benefit of U.S. Provisional Application 63/184,604, filed May 5, 2021. The aforementioned application is herein incorporated by reference in its entirety.

BACKGROUND

Field

Implementations of the present disclosure generally relate to an apparatus for large-scale external pressure storage, and more particularly for large-scale storage of liquid hydrogen and other products that utilizing evacuated insulation.

Description of Related Art

Due to the extremely low storage temperature of liquid hydrogen (−253° C.), liquid hydrogen storage vessels use vacuum insulation, otherwise gases like $O_2$ and $N_2$ can condense and freeze drawing a partial vacuum, and resulting in progressively more gas to the cold face, and potential condensate causing ice build-up. Ice build-up on the face of the vessel creates an undesirable heat load on the insulation which allows heat to leak into the vessel causing boil-off of the stored product. For this reason, liquid hydrogen is stored in a vacuum jacketed, column supported pressure vessel that is designed in accordance with ASME Section VIII Division 1 or 2. Owing to the unique thermodynamic properties of liquid hydrogen, liquid hydrogen uses fully evacuated insulation around the cold vessel to reduce boil-off of the cold vessel contents.

Therefore, there is a need for apparatus that can provide large-scale external pressure storage.

SUMMARY

In one embodiment, a plate for an outer vessel of a storage apparatus is provided. The plate includes a body that includes a beveled joint with the body having a nominal thickness at the beveled joint. The beveled outer joint is configured to be welded to a corresponding beveled joint of an adjacent plate.

In another embodiment, a plate for an outer vessel of a storage apparatus is provided. The plate includes a body including an outer edge and at least one stiffener coupled to the body inside the outer edge. The outer edge is configured to be welded to a corresponding edge of an adjacent plate without contact between the at least one stiffener and the adjacent plate.

BRIEF DESCRIPTION OF THE DRAWINGS

Implementations of the present disclosure, briefly summarized above and discussed in greater detail below, can be understood by reference to the illustrative implementations of the disclosure depicted in the appended drawings. It is to be noted, however, that the appended drawings illustrate only typical implementations of this disclosure and are therefore not to be considered limiting of its scope, for the disclosure may admit to other equally effective implementations.

FIG. 1B illustrates an exemplary embodiment of a plate.

FIG. 1C illustrates a cross-sectional view of the plate in FIG. 1B.

FIG. 1D illustrates a cross-sectional view of adjacent plates that are welded together.

FIG. 1F illustrates an additional embodiment of a plate.

FIG. 1G illustrates a cross-sectional view of the plate shown in FIG. 1F.

FIG. 1H illustrates an additional embodiment of a plate.

FIG. 1I illustrates a cross-sectional view of the plate shown in FIG. 1H.

Figure 1A:
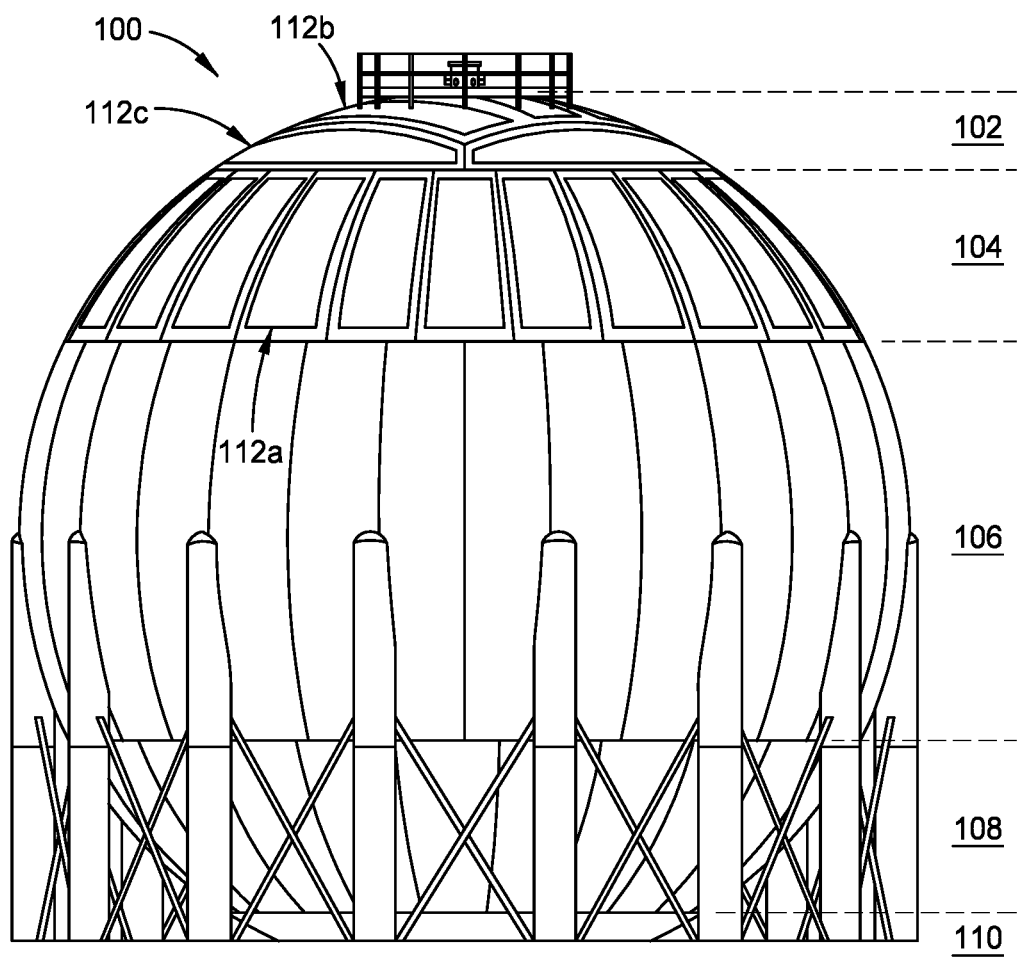
FIG. 1A illustrates a storage sphere, according to certain embodiments.

To facilitate understanding, identical reference numerals have been used, where possible, to designate identical elements that are common to the figures. The figures are not drawn to scale and may be simplified for clarity. It is contemplated that elements and features of one implementation may be beneficially incorporated in other implementations without further recitation.

DETAILED DESCRIPTION

This disclosure describes a plate for the outer vessel of a storage apparatus that has a nominal thickness at the outer edge of the plate, and an outer vessel of a storage container incorporating the same. The outer edge is configured to be welded to a corresponding edge of an adjacent plate. The plate is stiffened inside of the outer edge. The stiffening can be in the form of an increased plate thickness or welded stiffeners inside of the outer edge of the plate or a combination of increased plate thickness and welded stiffeners. For example, the stiffener could be one or more members, such as plates, braces, framing or the like. When the plates are welded together to form the outer storage vessel, the stiffening imparted by the internal plate thickness and/or stiffeners prevents buckling of the outer storage vessel due to external pressure.

Embodiments disclosed herein provide shell plates having an interior stiffer than the joints (edges). The stiffened plates disclosed herein may be stiffened by increasing the thickness of the interior of the plate, by attaching stiffening members to the plate, or a combination of both increasing the plate thickness and attaching stiffening members to the plate. This is advantageous because the stiffened plates resist buckling without increasing the cost of welding required to join the plates together. The stiffened plates disclosed herein may be used for vessels of any shape, e.g., spherical, cylindrical, and elliptical shaped vessels. In one example, the stiffened plates may be used for a thermal vacuum chamber.

Conventional practice involves the use of plates of a uniform thickness great enough to prevent buckling. Plates having uniform thickness require significantly more welding to join the plates, which is a limiting factor to economically scaling up liquid hydrogen spheres to capacities above about 5,500 $m^3$. Previously, to scale up above 5,500 $m^3$ the sphere would require additional stiffening applied after the plates are joined which would add schedule time and expense.

Embodiments disclosed herein allow a maximum size of liquid hydrogen spheres to be scaled up to, e.g., approximately 40,000 $m^3$ (i.e., about 8× larger than the capacity that can be achieved using conventional design methods) or larger (e.g., 100,000 $m^3$), at least in part because the storage embodiments described herein significantly reduce the welding costs for joining the plates in this storage range while providing adequate stiffness. Conventional designs cannot be scaled up because of the high welding costs for double-walled vessels of conventional configuration and material selection.

In some examples, it may be beneficial to use the stiffened plates on only part of the spheres. For example, if the equator plates are stiff enough to prevent buckling due to attachments to the support structure for the outer vessel and attachments to support the inner vessel, only the plates above and below the equator course may be stiffened.

Embodiments disclosed herein provide a stiffener configuration that allows all stiffening to be installed in the fabrication shop rather than being welded in the field, which significantly lowers the project cost and shortens the field/construction schedule. The stiffening will be applied to the individual shell plates in the shop and the stiffened plates will be sent to the field for assembly. Conventional practice involves running built-up structural stiffeners meridionally and latitudinally (continuously) around the entire vessel to provide global stability. Conventional stiffeners span over multiple shell plates and cross all circumferential weld seams, which requires the stiffeners to be installed in the field after the shell plates have been assembled. However, embodiments disclosed herein advantageously avoid this in-field expense. It is contemplated, however, that stiffeners may still be installed in the field and/or after assembly of the shell plates disclosed herein. Although, as noted previously, the number of stiffeners applied may be reduced compared to conventional design requirements, thus resulting in less expensive manufacturing and constructing of the vessels disclosed herein. The use of stiffeners with plate embodiments described herein may improve buckling capacity of the shell compared to corresponding shells without stiffeners.

FIG. 1A illustrates a storage sphere 100, according to certain embodiments. The storage sphere 100 (from top to bottom) generally has a top head 102, a top hip course 104, an equator course 106, a lower hip course 108, and a bottom head 110. The storage sphere 100 is formed from a plurality of plates 112 (three labeled for clarity: 112a-c) having various shapes (shown in more detail in FIGS. 1B, 1F, 1H). Thu number plates may range from dozens, to hundreds, or more. Although not shown, the storage sphere 100 surrounds and supports an inner sphere, and the space between the inner sphere the storage sphere 100 is held at vacuum pressure. A cryogenic substance, such as liquid hydrogen, is storable in the inner sphere. This vacuum pressure causes an external pressure of atmosphere to be applied from outside to inside the storage sphere 100.

FIG. 1B illustrates a top view of an exemplary plate 112a. Plate 112a includes a plate body 113 and one or more stiffeners 118. Referring to FIG. 1C, a cross-sectional view of the plate 112a about the section line C-C, a beveled surface 114 is formed around an outer edge (perimeter) 116 of the plate body 113. The beveled surface 114 extends from a central portion 115 of the plate body 113 to the edge 116. The thickness of the plate body 113 decreases along the length of the beveled surface 114 as shown in FIG. 1C, and the bevel surface 114 has a thickness less than the central portion 115. In one example, the distal end of the bevel surface 114 has a thickness that is about 10 percent to about 90 percent of the thickness of the central portion 115, such as bout 15 percent to about 85 percent, such as about 20 percent to about 80 percent, such as about 25 percent to about 75 percent, such as about 30 percent to about 70 percent, such as about 35 percent to about 65 percent, such as about 40 percent to about 60 percent, such as about 45 percent to about 55 percent. It is to be noted that other thickness ratios are also contemplated, depending upon structural specifications.

The beveled surface 114 may account for about 1 percent to about 40 percent of the width of the plate body 113 and any particular longitudinal position of the plate body 113. For example, the beveled surface 114 may account for about 1 percent to about 30 percent of the width of the plate body 113, such as about 1 percent to about 20 percent, or about 1 percent to about 15 percent, or about 1 percent to about 10 percent, or about 1 percent to about 5 percent, or about 3 percent to about 5 percent or about 1 percent to about 3 percent. It is to be noted that other configurations are also contemplated. In one example, the beveled surface 114 is formed at an angle of about 60 degrees or less with respect to the plate body 113 or a back surface thereof, such as about 45 degrees or less, or about 30 degrees or less, or about 5 degrees to about 45 degrees, such as about 5 degrees to about 40 degrees, or about 5 degrees to about 30 degrees, or about 5 degrees to about 20 degrees, or about 20 degrees to about 30 degrees. It is to be noted that other angular configurations are also contemplated. Additionally, it is to be noted that while the plate body 113 is illustrated as being generally planar, it is to be noted that the plate body 113 may also be arcuate in shape to facilitate formation of a circular vessel. In another example, it is contemplated that one of the upper surface or the lower surface of the plate body may be planar, with the other of the upper surface or the lower surface may be arcuate.

One or more optional stiffeners 118 are installed inside the perimeter 116 of each individual plate body 113. The stiffeners 118 are welded to a body of the plate 112 just beyond the inside of the bevel surface 114 on the central portion 115. As shown, the stiffeners 118 conform to the shape of the perimeter 116. As illustrated, the stiffeners 118 are disposed within the perimeter 116 of the individual shell plates 112a and do not cross the perimeter 116. Thus, the stiffeners 118 may be installed in the shop since the stiffeners 118 do not cross any weld seams when the plate 112a is welded to another plate, such as another plate 112a. The stiffeners 118 may be located inside the sphere, outside the sphere, or both when the plate 112a is installed to construct the storage sphere 100. In one example, the stiffeners 118 are linear members. The stiffeners may be welded to the plate 112a along a length of the stiffener 118, or may be welded at discrete locations of the stiffener 118. In one example, when using a plate 112a having a contoured (e.g., arcuate) surface, the stiffeners 118 may also have a corresponding contoured (e.g., arcuate) surface for increased engagement with the plate 112a.

Figure 1E:
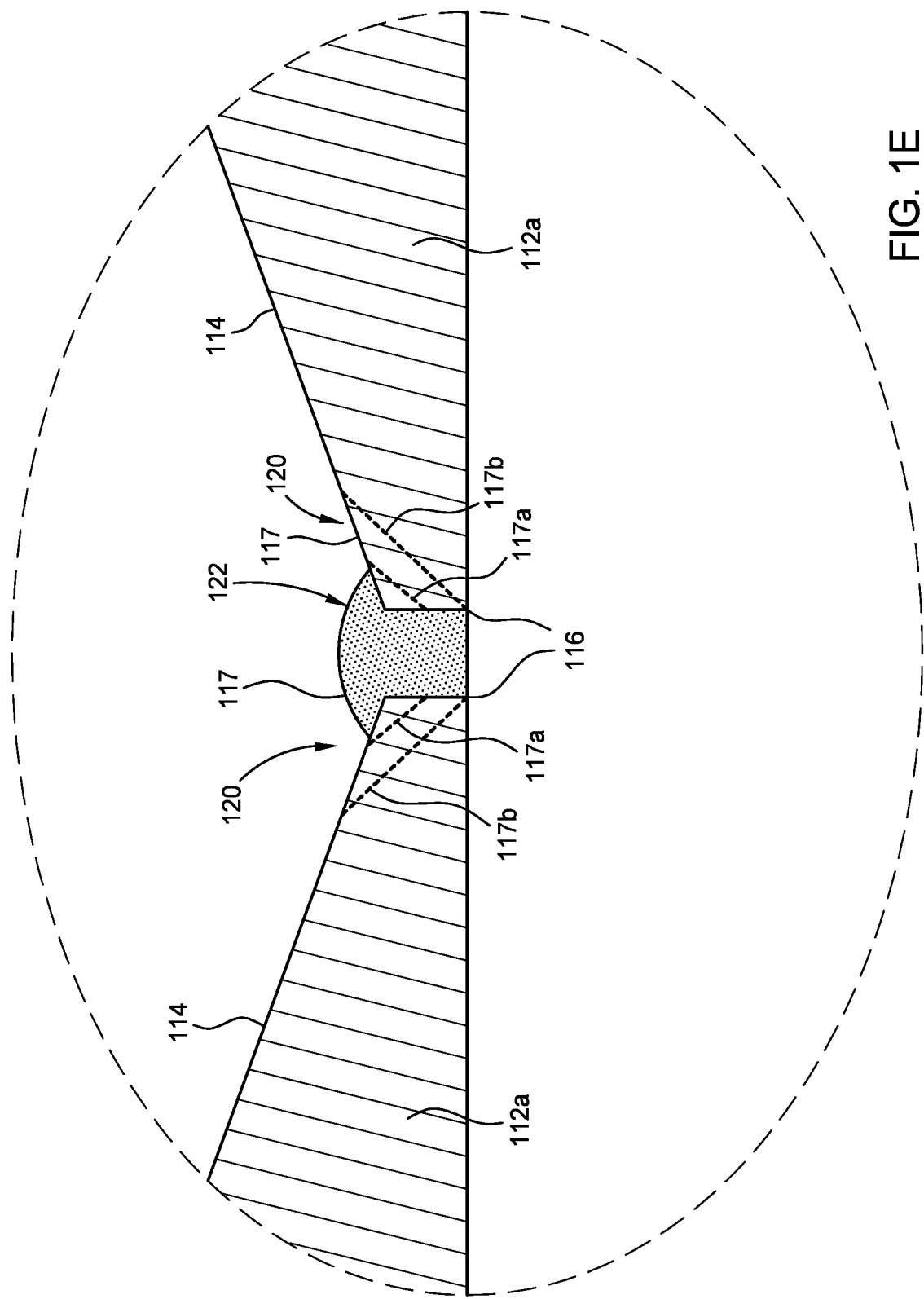
FIG. 1E illustrates the circled region in FIG. 1D.

FIG. 1D-1E are cross-sectional views illustrating two plates 112a welded together at an adjacent beveled joint 120 of each plate 112a. While the two plates 112a are shown disposed in the same plane and/or approximately parallel to one another, it is to be understood that the plates 112a may also be positioned at an angle relative to one another to approximate a portion of sphere, thus facilitating formation of a spherical structure. The beveled joint 120 may include the outer edge 116 and a portion 117 of the beveled surface 114. The joint 120 has a thickness less than a thickness of the central portion 115. The joints 120 are then welded together to form a weld 122. FIG. 1E is an enhanced view of the region in FIG. 1D to show that the weld 122 is formed on the outer edge 116 of each plate 112a and the portion 117 of the beveled surface 114. FIG. 1E shows the edge 116 as flat. However, the edge 116 may have a contour, such as being rounded. In some embodiments, the beveled surface 114 includes the edge 116, and the contour of the beveled surface 114 terminates at the edge 116.

In some embodiments, the portion 117 of the beveled surface 114 has the same contour, such as a taper, as the rest of the beveled surface 114 as shown in FIG. 1E. An alternative portion 117a with a different contour than the beveled surface 114 is represented by dashed line 117a. As shown, the portion 117a has a contour that is at an angle steeper than the angle of the rest of the beveled surface 114 (e.g., facilitating formation of double-beveled surface or back-beveled surfaced). As shown by the trajectory of dashed line 117a, the joint 120 including the alternative portion 117a may have a flat edge 116 extending from the end of the portion 117a to the bottom of the plate 113. An additional alternative portion 117b is represented by dashed line 117b. The contour of portion 117b may extend to the bottom surface of the plate 113 such that edge 116 does not present a flat face.

The portions 117a and 117b may be formed to facilitate the formation of a weld. For example, the portions 117a, 117b may be used to form X-seams or V-seams for adjoining adjacent plates. Other welding seams and joints are also contemplated.

FIG. 1F illustrates at top view of plate 112b, and a cross-section of the plate 112b about section line G-G is shown in FIG. 1G. FIG. 1H illustrates at top view of plate 112c, and a cross-section of the plate 112c about section line I-I is shown in FIG. 1I. Plates 112b and 112c are similarly constructed as plate 112a. Plates 112b, 112c differ from plate 112a in that the plate body 113 has a different perimeter geometry. The plates 112b and 112c may also have a different arrangement of stiffeners 118 to conform to the different perimeter geometry. The edge 116 may be defined by the end of the portion 117, 117a, or 117b as shown above.

Multiple plates can be welded together to form the storage sphere 100. For example, plate 112a may be welded at each joint 120 to another plate 112a or a plate having a different geometry, such as plates 112b, 112c. Plates 112b, 112c may be similarly welded to other plates in a similar manner as described above for plate 112a.

In some embodiments, the edges 116 of the plates 112a, 112b, 112c abut (e.g., contact) an edge of an adjacent plate.

In some examples, the stiffeners 118 may only be used on plates, such as plates 112a-c, above and below the equator course 106 at least in part because the equator plates already include stiffening as part of the inner sphere support structure.

In some aspects, the stiffeners 118 and/or the plates 112a-c are formed of one more alloys, such as steel, for example, carbon steel. Other materials, such as aluminium (and aluminium alloys) are also contemplated.

Aspects herein provide for plates, and vessels using the same, having an increased thickness at a central portion thereon and a reduced thickness at perimeter thereof. Such a configuration provides increased support and/or stiffness due to the increased material at the central portion thereof, while reducing the costs associated with welding adjoining plates due to the decreased material thickness at perimeters of the plates. The plates facilitate cost-effective construction of spherical storage vessels, particularly of vessels having increased storage capacity, such as about 5,500 m$^3$ or greater.

While the foregoing is directed to implementations of the present disclosure, other and further implementations of the disclosure may be devised without departing from the basic scope thereof.

The invention claimed is:

1. A plate for an outer vessel of a storage apparatus, comprising:
    a body, the body having:
        a central portion with a first thickness;
        a beveled surface that extends from the central portion to an outer edge; and
        the outer edge having a vertical surface connected to the beveled surface; and
    a beveled joint that includes the vertical surface of the outer edge and a portion of the beveled surface, the beveled joint having a second thickness less than the first thickness at the central portion of the body, wherein the beveled joint is configured to be welded to a corresponding beveled joint of an adjacent plate.

2. The plate of claim 1, wherein the beveled joint is disposed around the entire perimeter of the body.

3. The plate of claim 1, wherein the second thickness of the beveled joint is about 30 percent to about 70 percent of the first thickness at the central portion of the body.

4. The plate of claim 1, wherein one or more stiffeners are coupled to the body inside the beveled joint.

5. The plate of claim 4, wherein the one or more stiffeners comprises two parallel stiffeners.

6. The plate of claim 4, wherein the one or more stiffeners are arranged to conform to a perimeter of the body.

7. The plate of claim 1, wherein the portion of the beveled surface and the beveled surface have a different contour.

8. A plate arrangement for a storage apparatus, comprising:
    a plurality of plates, each plate includes:
        a body, the body having:
            a central portion with a first thickness;
            a beveled surface that extends from the central portion to an outer edge; and
            the outer edge having a vertical surface connected to the beveled surface; and
        a beveled joint including the vertical surface of the outer edge and a portion of the beveled surface, the beveled joint having a second thickness less than the first thickness at the central portion of the body, wherein each plate is welded at the beveled joint to the beveled joint of at least one other plate of the plurality of plates.

9. The plate arrangement of claim 8, wherein the beveled surface surrounds the central portion of the body.

10. The plate arrangement of claim 9, wherein at least one stiffener is coupled to the central portion within the boundary of the beveled surface.

11. The plate arrangement of claim 10, wherein the at least one stiffener coupled to the central portion of a first plate of the plurality of plates does not contact a second plate of the plurality of plates.

12. The plate arrangement of claim 10, wherein the at least one stiffener is arranged in a geometry that conforms with a perimeter geometry of the body defined by an outer edge of the body.

13. The plate arrangement of claim 9, wherein the second thickness of the beveled joint is about 30 percent to about 70 percent of the first thickness at the central portion of the body.

14. The plate arrangement of claim 8, wherein the portion of the beveled surface and the beveled surface have a different contour.

15. A large scale cryogenic storage vessel, comprising:
    a plurality of plates in a spherical arrangement to form a thermal vacuum chamber, wherein each plate includes:

a body including a central portion and an outer portion surrounding the central portion; and a stiffener disposed on the body completely surrounding the central portion and contoured to the shape of a perimeter of the outer portion.

16. The vessel of claim 15, wherein one or more stiffeners do not contact another plate of the plurality of plates.

17. The vessel of claim 15, wherein an equator course of the vessel does not include a plate of the plurality of plates, and wherein the equator course is formed from an arrangement of second plates.

18. The vessel of claim 15, wherein at least two of the plates have different stiffeners contoured to different perimeters of the outer portion.

\* \* \* \* \*